United States Patent [19]
Khoo

[11] Patent Number: 5,589,101
[45] Date of Patent: Dec. 31, 1996

[54] LIQUID CRYSTAL FIBER ARRAY FOR OPTICAL LIMITING OF LASER PULSES AND FOR EYE/SENSOR PROTECTION

[75] Inventor: Iam-Choon Khoo, State College, Pa.

[73] Assignee: The Penn State Research Foundation, University Park, Pa.

[21] Appl. No.: 417,332

[22] Filed: Apr. 5, 1995

[51] Int. Cl.[6] .............................. C09K 19/00; G02F 1/13; G02B 6/00
[52] U.S. Cl. ................. 252/299.01; 385/143; 252/299.1; 349/62
[58] Field of Search ............................ 252/299.01, 299.1; 359/36, 42, 45; 385/143, 145

[56] References Cited

U.S. PATENT DOCUMENTS

| | | | |
|---|---|---|---|
| 4,765,719 | 8/1988 | Fergason | 359/45 |
| 5,361,320 | 11/1994 | Liu et al. | 385/143 |

OTHER PUBLICATIONS

I.C. Khoo et al., "Isotropic Liquid Crystalline Film and Fiber Structures For Optical Limiting Application", Int. Journal of Nonlinear Optical Physics, vol. 2, No. 4, (1993) pp. 559–575.

I.C. Khoo, "Observation of Optical Limiting and Backscattering of Nanosecond Laser Pulses in Liquid–Crystal Fibers", Optics Letters, vol. 19, No. 8, Apr. 15, 1994, pp. 530–532.

I.C. Khoo et al., "Nonlinear Optical Propagation and Self–Limiting Effect In Liquid–Crystaline Fibers", Appl. Phys. B59, (1994) pp. 573–580.

*Primary Examiner*—Shean C. Wu
*Attorney, Agent, or Firm*—Thomas J. Monahan

[57] ABSTRACT

A protective liquid crystal fiber array includes a body having a plurality of capillary passages extending between incident and transmitting faces. A liquid phase, liquid crystal material is positioned in each of the capillaries and optically transparent closures are positioned on the incident and transmitting faces to retain the liquid phase liquid crystal material within the capillaries. The liquid crystal material is substantially transparent at low levels of optical energy, which at high levels of incident optical energy, exhibits an optical limiting effect as a result of a negative change in its refractive index. The change in refractive index is enhanced as a result of thermal density effects due to the restriction of the incident optical energy within the diameter of one or more capillaries.

11 Claims, 13 Drawing Sheets

LIQUID CRYSTAL FIBER ARRAY FOR OPTICAL LIMITING OF LASER PULSES AND FOR EYE/SENSOR PROTECTION

FIELD OF THE INVENTION

This invention relates to devices for limiting incident optical energy and, more particularly, to a liquid crystal fiber array (LCFA) for performing limiting actions.

BACKGROUND OF THE INVENTION

Liquid crystals in their various ordered and disordered phases have been shown to possess large optical nonlinearities over wide temperature and spectral ranges. Consequently, almost all types of nonlinear optical phenomena have been observed. In particular, nonlinear propagation and optical limiting, stimulated backscattering and phase conjugation have been observed in bulk, thin-film and liquid cells. In the case of optical limiting applications, the threshold for such nonlinear effect in bulk films of a class of isotropic liquid crystals is very low and ranks among the lowest of all known nonlinear optical materials. However, in tightly focused geometries, thresholds begin to increase drastically. Such an increase is attributed to the decreased interaction region in tightly focused geometries. In a reported experiment, it has been demonstrated that the threshold for optical limiting of nanosecond visible-laser pulses could be considerably reduced if guided-wave geometry is employed, and in tightly focused geometries, the low threshold for optical limiting appeared to hold.

Optical limiting action with the ordered-phase liquid crystals, such as nematics, has been studied in various contexts. The application of these effects to practical devices, however, suffers a fundamental limitation imposed by the large scattering loss in the nematic phase.

Typically, the orientational fluctuation-induced scattering loss amounts to about 20 db/cm (about 100 cm$^{-1}$) in nematics and slightly less in smectics. They are, therefore, usually assembled in thin-film forms for nonlinear optical applications, with the laser-liquid crystal interaction region limited to less than $10^2$ μm. See: I. C. Khoo, S. T. Wu: *Optics and Nonlinear Optics of Liquid Crystals* (World Scientific, Singapore 1993); I. C. Khoo, *Liquid Crystals: Physical Properties and Nonlinear Optical Phenomena*, Wiley Interscience, 1995; and I. C. Khoo et al.; *Special Issue on Optical Switches Limiters and Discriminators*, Int. J. Nonlinear Opt. Phys. 3, pp. 559–575, (1993) and I. C. Khoo et al., Opt. Lett. 19, 530 (1994).

On the other hand, orientational and density-fluctuation-induced scattering losses are considerably reduced in the isotropic phase (<<1 cm$^{-1}$), thus permitting interaction geometries involving much longer optical path lengths. Furthermore, isotropic liquid crystals have also been shown to possess sizable (comparable to the numatic and smectic phase) optical nonlinearities on the nanosecond time scale, and, generally, respond faster than the ordered phase.

Figure 1:
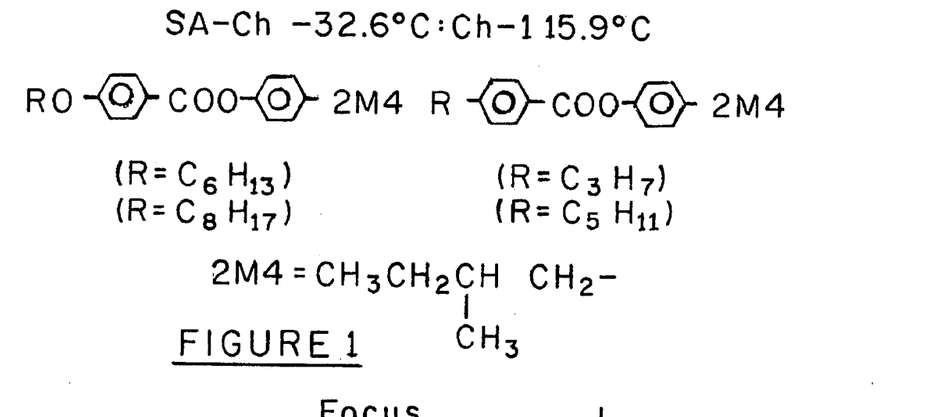
FIG. 1 illustrates the chemical structure of the molecular constituents of an isotropic liquid crystal TM74A.

In recent papers, Khoo et al. Optics Letters, 19, pp. 530–532 (1994) and Applied Physics, B59, pp. 573–580 (1994), Applicant has reported the results of a series of experiments carried out on a particular class of commercially available isotropic liquid crystal mixtures (TM74A, from EA Chemicals, New York) which is henceforth called ILC. The chemical structures of the molecular constituents of ILC are shown in FIG. 1. This material has also previously been shown to exhibit stimulated backscattering and phase-conjugation and optical limiting effects in conjunction with nanosecond Nd:YAG (0.523 μm) laser pulses.

On nanosecond and longer time scales, optical nonlinearities of isotropic-phase, liquid crystals suitable for practical applications are laser-induced molecular orientation, thermal and density effects. These nonlinearities do not directly involve the electronic structures of the molecular constituents. They are, therefore, adequately described by a model in which the liquid-crystalline molecules are anisotropic. In the isotropic phase, molecules are randomly distributed and theoretical modelling of the nonlinear optical phenomena are considerably simpler as one may use the averaged or effective values for anisotropic physical parameters.

The optical nonlinearities are described by the following equations.

Orientational: Isotropic phase $$\eta \frac{\partial Q_{\alpha\beta}}{\partial \tau} + AQ_{\chi\beta} = \Delta\chi(3E^*_\alpha E_\beta - |E|^2\delta_{\chi\beta})/9; \quad (1)$$

Thermal $$\rho_0 C_p \frac{\partial(\Delta T)}{\partial t} - \lambda_T \nabla^2(\Delta T) - (C_p - C_v)\frac{1}{B}\frac{\partial}{\partial t}(\Delta\rho) = \quad (2)$$

$$\frac{\alpha nc}{4\pi} Re(E_{op} \cdot E^*_{op})$$

Density $$\frac{\partial^2 \Delta\rho}{\partial t^2} + \frac{v_s^2}{\gamma}\nabla^2(\Delta\rho) + \frac{v_s^2 B\rho_0}{\gamma^2}\nabla^2(\nabla T) + \quad (3)$$

$$\frac{\eta}{\rho_0}\frac{\partial \nabla^2(\Delta\rho)}{\partial t} = -\frac{\gamma^e}{8\pi}\nabla^2 E^2_{OP};$$

where $\gamma$ and $\eta$ are viscosity coefficients, Q is the order parameter, $\Delta_\chi$ the susceptibility anisotropy, $\alpha$ the absorption constant, $\rho_0$ the density, $C_p$ $C_v$ the specific heats, $v_s$ the sound velocity, B the bulk modulus, $\lambda_T$ thermal conductivity, $\gamma^e$ the electrostrictive coefficient, E the optical electric field, and $A=a(T-T^*)$ is a parameter characterizing the orientational response of isotropic liquid crystals near the phase transition temperature $T_c(\approx T^*)$.

Equation (1) describes the molecular-orientation order induced by the laser in the isotropic phase where the equilibrium value of the order parameter is zero. It can be shown that such an induced-ordering effect gives rise to a third-order nonlinear polarization, i.e., an intensity refractive-index change. Studies have shown that the third-order nonlinear susceptibility $\chi^{(3)}$ is on the order of $10^{-10}$ esu and is highly dependent on the temperature vicinity of $T_c$. Equally important to note is the dependence of the response-time constant $\tau$ on the temperature $\tau=\eta/a(T-T^*)$.

The closer it is to $T_c$, the longer is the response time. Response times ranging from a few nanoseconds to hundreds of nanoseconds have been observed. Therefore, the role played by laser-induced molecular reorientation in the optical limiting action of nanosecond-laser pulses is also highly dependent on the laser-field-polarization state as well as the temperature. For (cylindrical) guided-wave devices intended for nanosecond response, such orientational nonlinearity is not very useful.

Equation (2), which is coupled to (3) for the density fluctuation, describes the laser-induced temperature increase in the liquid crystal as a result of (linear or nonlinear photoabsorption). The amount of temperature rise and the resulting refractive-index change depends on the interaction geometry, e.g., the focused laser-spot size and the material's physical dimensions and the conductivities of boundary materials.

Equation (3) describes the laser-induced density change associated with the electrostrictive effect and the temperature rise. Note that any density wave thus created will propagate away from the region of interaction with the sound velocity; the Brillouin damping constant $\tau_B$ for the decay of the density component is also dependent on the dimension of the interaction region.

For the typical geometry and laser-spot sizes involved in the processes under study, the typical Brillouin response time $\tau_B$ is on the order of a few to tens of nanoseconds. It is not sensitive to the temperature.

Figure 2:
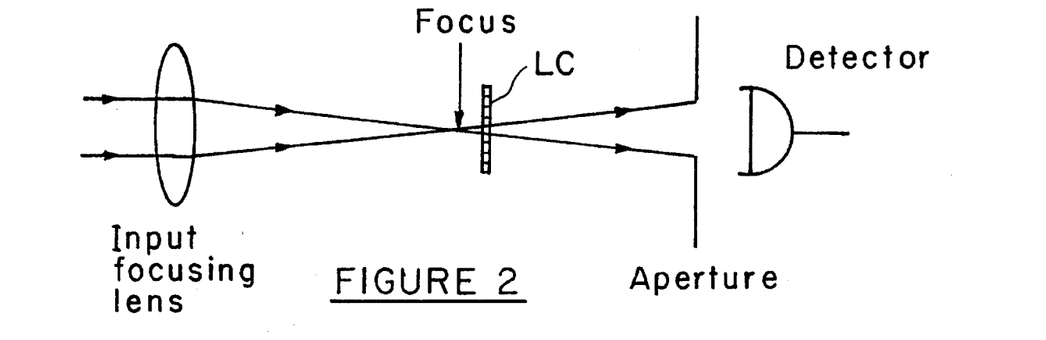
FIG. 2 illustrates an experimental set up for optical limiting action using a self defocussing effect resulting from a bulk liquid crystal thin film.
Figure 3:
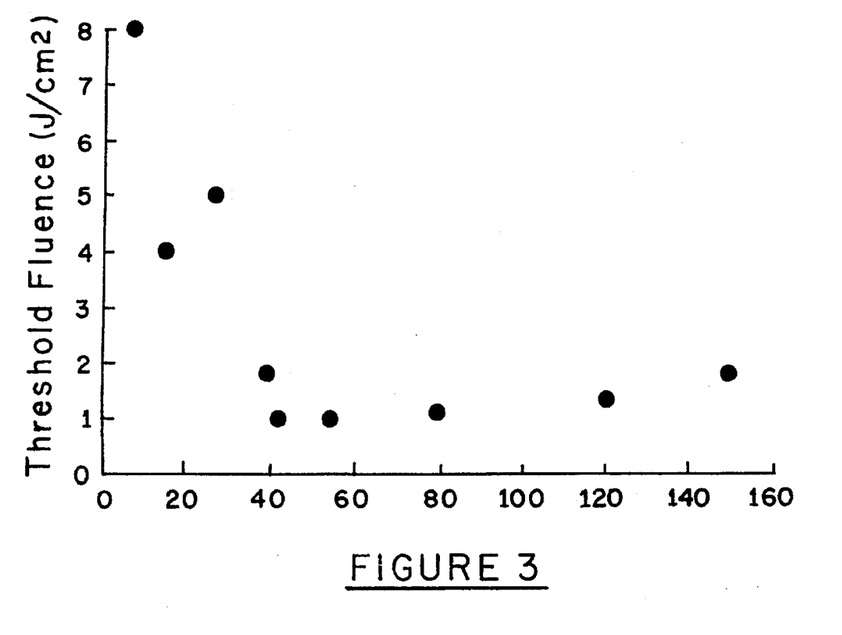
FIG. 3 is a plot of observed limiting-threshold fluence (in units of laser energy per unit area) as a function of a focused laser spot diameter on the liquid crystal film of FIG. 2.

In recent studies of self-defocusing phenomena, it has been demonstrated that a laser-induced density change, and the accompanying change in refractive index, can lead to a low-threshold optical limiting action. The experimentally observed threshold for a bulk film, using a self-limiting set up as shown in FIG. 2, are plotted in FIG. 3. FIG. 3 plots observed optical limiting-threshold fluence (in units of laser energy per unit area) as a function of the focused laser-spot diameter on the ILC film, and shows large increases at small diameters. Notice that as the input-laser beam-spot diameter is reduced to below 40 μm, the threshold laser fluence (in $J/cm^2$) begins to increase drastically. This is attributed to the reduced interaction region between the laser pulse and the laser-induced thermal density index change in a tightly focused geometry.

In sum, liquid crystals in their various ordered and disordered phases have been shown to possess large optical nonlinearities over a wide temperature and spectral range. Consequently, almost all types of nonlinear optical phenomena have been observed. In particular, nonlinear propagation and optical limiting, stimulated back scattering and phase conjugation have all been observed in bulk thin film or liquid cells. It is also known that a nonlinear optical response of a material will be greatly enhanced (and the efficiency of a nonlinear phenomena enhanced) if guided wave geometries are employed.

There is a need for devices which protect both the eyes and sensitive optical instruments against damage from an incident laser beam. However, liquid crystal nonlinearity thresholds exhibited by bulk thin films and/or liquid crystal cells are too high to provide a satisfactory optical limiting effect when subjected to a high intensity optical beam. As a result, liquid crystal geometries have not heretofore been used for optical protection applications which must respond in nanosecond time intervals.

Accordingly, it is an object of the invention to provide a device which protects against incident high intensity optical beams.

It is another object of this invention to provide an optical protection device which requires no external control instrumentality.

It is yet another object of this invention to provide an optical protective device that is physically small and reacts to an incident beam in a nanosecond time interval.

SUMMARY OF THE INVENTION

A protective liquid crystal fiber array includes a body having a plurality of capillary passages extending between incident and transmitting faces. A liquid phase, liquid crystal material is positioned in each of the capillaries and optically transparent closures are positioned on the incident and transmitting faces to retain the liquid phase liquid crystal material within the capillaries. The liquid crystal material is substantially transparent at low levels of optical energy, which at high levels of incident optical energy, exhibits an optical limiting effect as a result of a negative change in its refractive index. The change in refractive index is enhanced as a result of thermal density effects due to the restriction of the incident optical energy within the diameter of one or more capillaries.

DETAILED DESCRIPTION OF THE INVENTION

Figure 4:
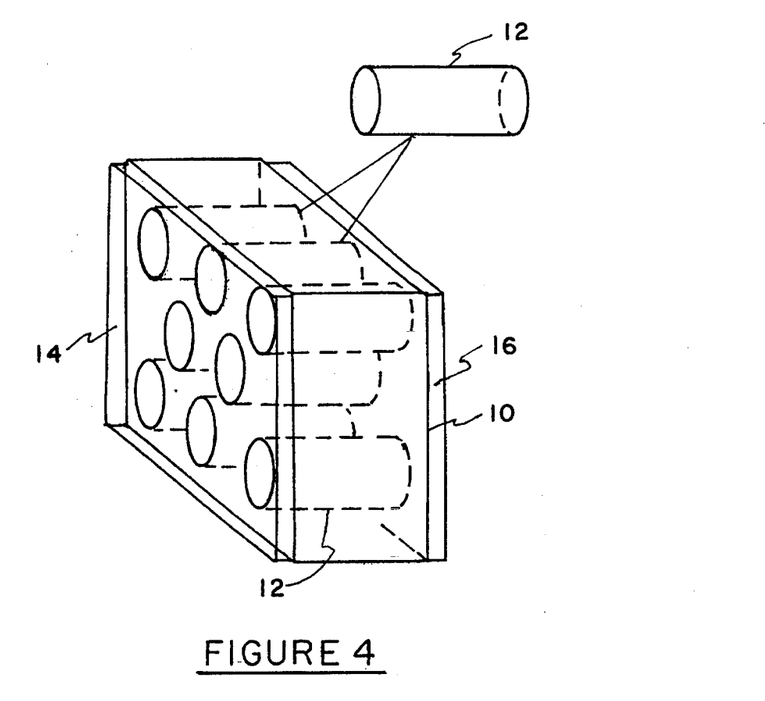
FIG. 4 is a perspective view of an embodiment of the invention comprising an optically transparent body having plural capillaries, each holding a liquid-phase, liquid crystal.

Referring to FIG. 4, an optical protective device is shown which incorporates the invention. A transparent block 10 includes plural capillary passages 12. Each capillary passage is filled with an isotropic liquid crystal material that is in the liquid phase at ambient temperature. A pair of optical flats 14 and 16 are positional on either side of block 10 and contain the liquid crystal in place with capillary passages 12. As will become apparent hereinafter, if the capillary diameters are within a range of 2 microns to 500 microns, a suitable liquid phase liquid crystal material therein will enable block 10 to have a thickness in the range of 3 millimeters to 7 millimeters and still exhibit high levels of optical limiting protection. The inclusion of dopants that are absorptive of optical energy in the liquid crystal material will further enhance the optical limiting effects thereof.

A benefit which flows from use of liquid phase liquid crystals is their high transparency and optical clarity at low levels of incident light intensities. Thus, at times other than when a high power beam is incident, capillaries 12 (and block 10) exhibit a high level of optical transparency.

Figure 4A:
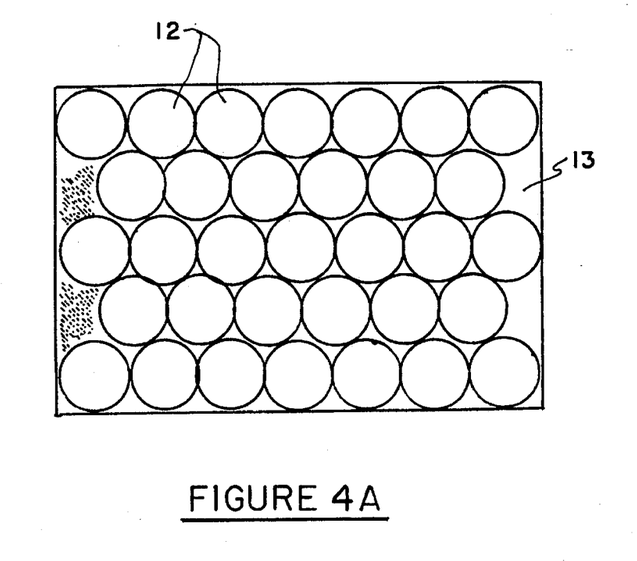
FIG. 4a is a plan view of the incident face shown in FIG. 4.
Figure 4B:
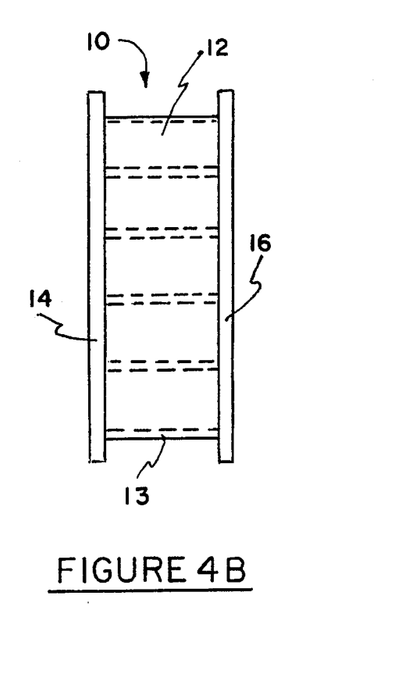
FIG. 4b is a side view showing a pair of optical flats positioned about the capillary-containing body of FIG. 4 so as to maintain the liquid crystal within the capillaries.

FIG. 4a is a plan view of the face of transparent block 10 and shows a high concentration of fibers 12 and a surrounding encapsulant 13. FIG. 4b is a side view of transparent block 10 with optical flats 14 and 16 positioned on the incident and transmitting faces, respectively, of block 10. Optical flats 14 and 16 serve to maintain the liquid crystal material within capillaries 12 and further assure that an incident beam is not distorted.

While detailed findings will be presented below, a summary of preferred liquid crystal materials and dopants is given below.

The preferred liquid crystal materials all exhibit a refractive index ~1.55, and are available from EM Chemicals, Hawthorne, N.Y. and have the following commercial names: E7 (above $T_c$); 5CB (above $T_c$); and TM74A. The chemical structures of each of the aforesaid liquid crystal materials are as follows:

E-7

Chemical structures of the four compounds making up the nematic liquid crystal E7.

5CB

Pentyl-cyano-biphenyl

TM74A where: (R = $C_6H_{13}$); or (R = $C_3H_7$); or
(R = $C_8H_{17}$); or (R = $C_5H_{11}$);

2M4 = $CH_3CH_2CHCH_2-$
          |
          $CH_3$

Preferred Dopants (concentration <=0.05% weight) are as follows: laser dyes; dichroic dyes (e.g., D16 available from EM Chemicals); fullerene $C_{60}$, $C_{70}$ (from Eastman Kodak Corp.) and phthalocyanine (β form) (from Aldrich Chemicals).

The preferred core dimension of capillaries 12 lie between 2 and 500 microns. A most preferred diameter range is 10 to 30 microns. Capillary-containing glass or polymer blocks can be obtained from Collimated Holes Inc., Campbell, Calif. or Galileo Electro-Optics Corp., Sturbridge, Mass. In brief, capillary-containing transparent blocks are constructed by first assembling a bundle of aligned capillary fibers, encapsulating them by application of a melted encapsulant and then removing the capillary fibers by a selective-etch procedure. A preferred range of refractive indices for the block material (encapsulant) is 1.49 to 1.54.

Since the index of preferred isotropic liquid crystals is about 1.55 or higher, each capillary 12 within the array, when filled with the liquid crystal, functions as a cylindrical optical waveguide. These cylindrical waveguides (which are called fibers as their length to core-diameter ratio is generally about $10^2$ and higher) will transmit light in single-mode or multi-mode operation, depending on the core diameter and the refractive index difference. Such a liquid crystal fiber array (LCFA) will therefore transmit an image formed at the incident face to the transmitting face plane, and the image can be read by a sensor, e.g., a CCD or Light Valve. An application of such an LCFA is for image processing and optical interconnects. Another principal application of the LCFA is for protection of an optical sensor position at the transmitting face. This protective action is enabled by the nonlinear optical scattering of an intense incident laser beam in its propagation through the fibers, as well as the nonlinear input coupling occurring at the fiber entrance region occupied by the isotropic liquid crystal.

This optical limiting structure has the following features: long interaction length (several mm to centimeters) as compared to other (ordered phase) liquid crystal based devices where the interaction region is on the order of 100–300 μm at most. Owing to confinement of the transverse dimension of the laser over such long interaction length, the nonlinear defocusing and scattering, as well as the nonlinear coupling effects are greatly enhanced. Furthermore, all other nonlinear optical processes will also be generated more efficiently, thus providing further limiting of the high intensity, harmful, laser beam. Therefore protection of the downstream detector/sensor is achieved.

The LCFA device possesses all the usual imaging abilities of a conventional fiber optic bundle, plus special features associated with liquid crystals. In particular, liquid crystals are millions of times more nonlinear (optically) than glass. Thus nonlinear optical processes/devices that used to require kilometers of ordinary glass fiber can be performed with a mm-dimension LCFA. For sensor protection applications, in particular, the LCFA is characterized further by the following properties:

a) large acceptance angle determined principally by the index difference of $n_g$ and $n_{lc}$, i.e. the system will provide optical limiting effect on an off-axis threat laser.

b) Will not suffer catastrophic damage because the input signal or image is focused at the incident face which is filled with liquid-like isotropic liquid crystals. A beam, which basically originates as a distant point source, will appear as a point spread function on the incident face. Therefore, if it is intense enough to cause material damage, it will be manifested as pin-prick blemishes in the field of view. The dynamic range of the LCFA is therefore as large as desired by the optical system in which it is implemented. Furthermore, because the liquid crystal chosen is in the isotropic (liquid) phase, these point "defects" will float, or can be forced to flow away.

c) Low threshold for switching/limiting: <1 μJ/cm$^2$ (<0.1 J/cm$^2$ in optical system with 10$^5$ gain).

d) Response speed: nanoseconds.

e) Applicable wavelength range: all important lasers in the visible (400 nm) to infrared (5 μm) spectral region, including: the diode laser wavelength (0.8–0.9 μm), communication channel (1.3–1.5 μm), high power lasers (Nd:Yag fundamental and harmonics, Chemical lasers (2–4 μm) . . . etc.

Experimental Data

Liquid crystal cored optical fibers have been fabricated by filling glass capillaries with liquid crystal in the isotropic phase (liquid at room temperature). Fibers with core diameters ranging from 2 to 200 μm have been made. The filling process is simply performed by inserting one end of a clean capillary into a slightly heated bottle containing the isotropic liquid crystal. For controlled light coupling into the filled fiber, the end surface of the liquid crystal cored fiber is maintained flat. This is achieved by sealing the end with a glass flat The output end of the fiber is similarly terminated by a glass flat in order to achieve consistent results for nonlinear propagation and scattering experiments.

A variety of liquid crystals have been tested. One is a commercially available mixture of cholesteric liquid crystals in the isotropic phase (TM74A, from EM Chemicals). Another is 5CB, Pentyl-Cyano-Biphenyl (also from EM Chemicals). TM74A is isotropic at room temperature, whereas 5CB has a clearing temperature of about 35° C., and should be kept in a heated temperature cell to operate in the isotropic phase. Both liquid crystals give similar results.

The typical refractive index of these glass capillaries and capillary arrays range from 1.45 to 1.53. On the other hand, the typical isotropic phase liquid crystal refractive index is about 1.55, and thus these liquid crystal cored glass capillaries function as optical fiber waveguides.

Since the liquid crystal material is highly nonlinear, the fiber structures are highly nonlinear optical cylindrical waveguides and allow generation of a variety of nonlinear optical phenomena. In particular, because of the intensity dependent index of the liquid crystal, the waveguiding and mode structures are easily modified by increasing the incident laser power. Because the optical nonlinearities of liquid crystals are orders of magnitude larger than a usual glass optical fiber, many nonlinear phenomena are observed in ordinary fibers with greatly reduced threshold or fiber length (e.g. instead of hundreds of meters or even kilometers, a few centimeters at most of these liquid crystalline fibers will perform well). The following discussions pertain to those obtained with TM74A.

Under nanosecond laser pulse excitation, the principle nonlinear optical mechanism in the liquid crystal-filled capillary is laser-induced density changes, and therefore, negative refractive index changes. This process, in the fiber geometry, leads to extended defocusing of the beam out of the guiding core, resulting in optical self-limiting effect in transmission. In a fiber array, input image light rays are guided towards the output end where the image intensity distribution can be scanned by a sensor or detection system (e.g., a CCD device). Optical limiting action and protection of the sensor or detector against high power laser radiation (which traverse the system as an intense ray in one of the fibers) utilize the self-defocusing effect. The defocusing effect is enhanced by the long interaction length between the input and the output ends of the array. The actual operation and principles of such imaging systems are understandably very complex, but obviously depend to a very large extent on the performance of a constituent fiber. Accordingly, a series of experiments have been performed to characterize the optical limiting effect in such a fiber.

Figure 5:
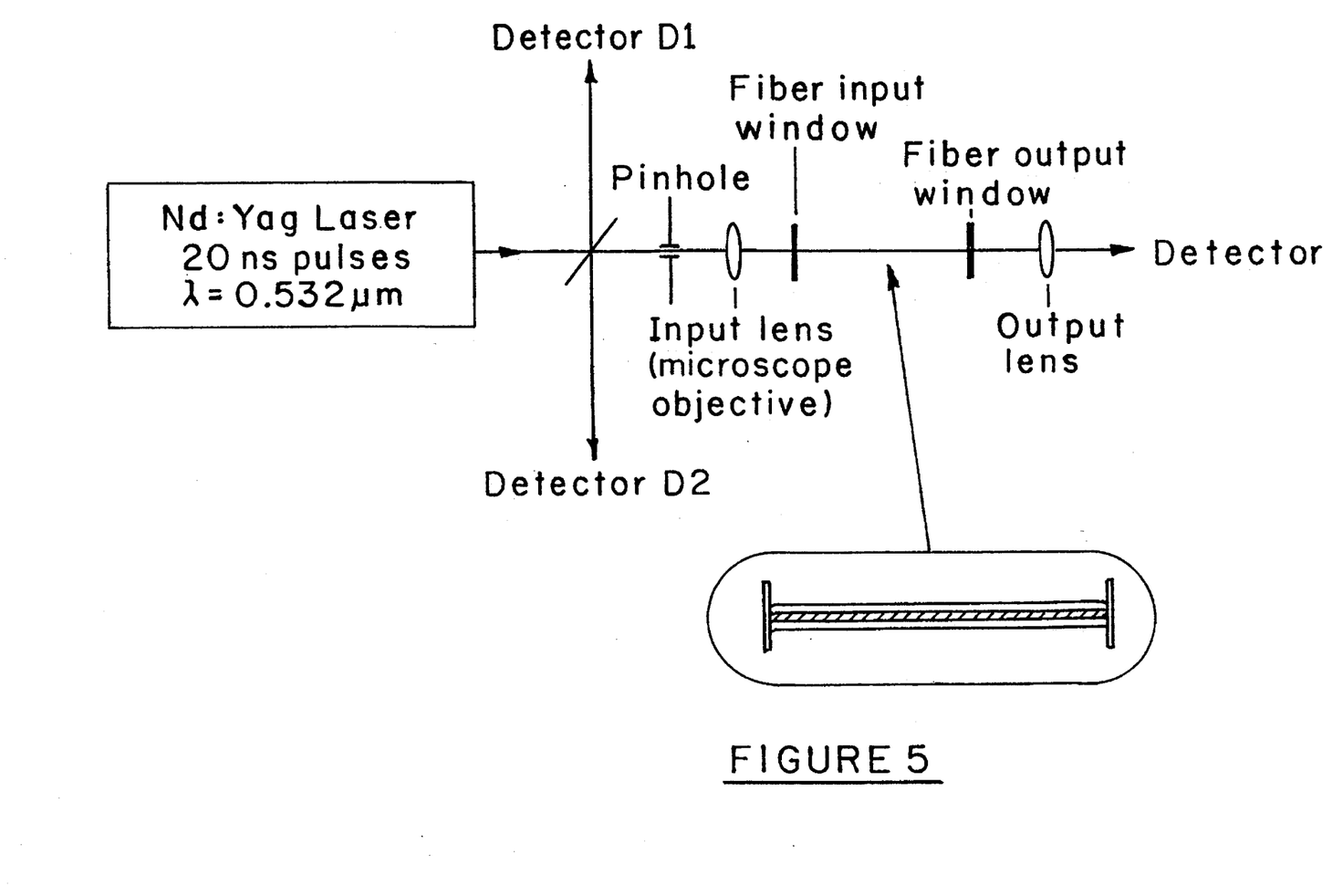
FIG. 5 is a schematic of the experimental set up used to study nonlinear pulse propagation in a liquid crystal fiber having a glass cladding.

FIG. 5 shows the experimental setup. The experiment is conducted at room temperature. The second harmonic of a 20 ns Nd:Yag laser pulse (λ=0.532 μm) of a roughly bell-shape transverse intensity distribution is focused by a 1 cm focal length lens into the liquid crystal fiber. The focal spot is located near the front entrance plane of the fiber.

Figure 6A:
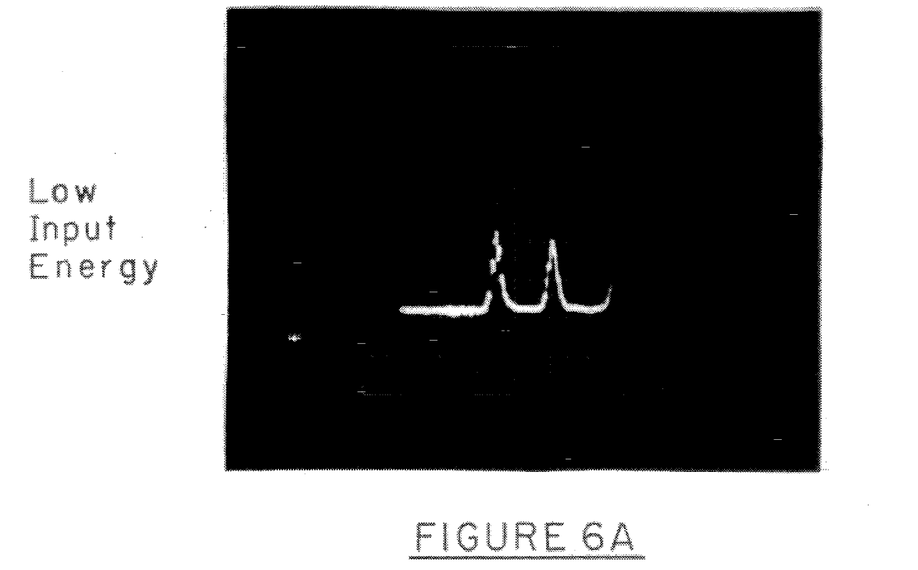
FIGS. 6a and 6b illustrate oscilloscope traces of input energy versus output energy for the glass clad, liquid crystal fiber of FIG. 5, with input (left) and transmitted (right) of 20 ns, 0.532 micron, Nd:Yag laser pulses; for low input energy (FIG. 6a) and high input energy (FIG. 6b).
Figure 6B:
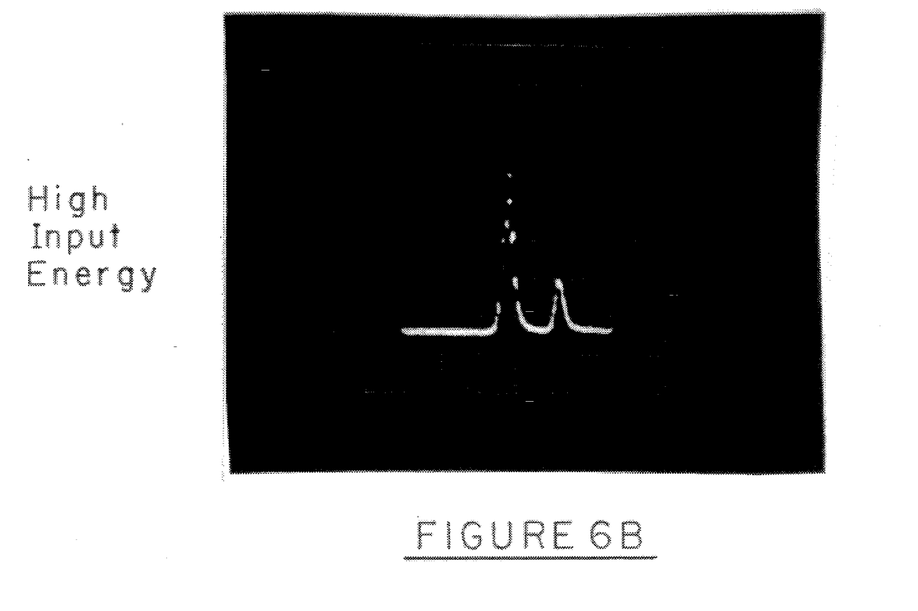

The fiber entrance plane is 1.2 mm from the lens where the diameter of the focused laser beam matches the fiber core diameter. The input beam diameter is 2 mm at the lens, corresponding to a F#6 input optics. The collection optics on the transmitted side is also a F#6 system. The limiting performance of the liquid crystal fiber is obtained by simultaneously monitoring the incident and output laser pulses on a high speed storage scope. FIG. 6a shows a typical oscilloscope trace of the incident (left) and the transmitted (right) pulses for low input energy. The relative pulse height gives a measure of the transmission. When the incident laser energy is increased, as shown in FIG. 6b, the transmission is observed to be greatly reduced as a result of self-limiting action.

From a large number of experimental runs, a parameter set has been determined that will enable the design of practical (nonlinear) liquid crystal fiber array (or faceplate) for eye/sensor protection applications. The experimentally derived information is contained in FIGS. 7–13, corresponding to fiber lengths of 7 mm, 5 mm and 3 mm, respectively.

Figure 7:
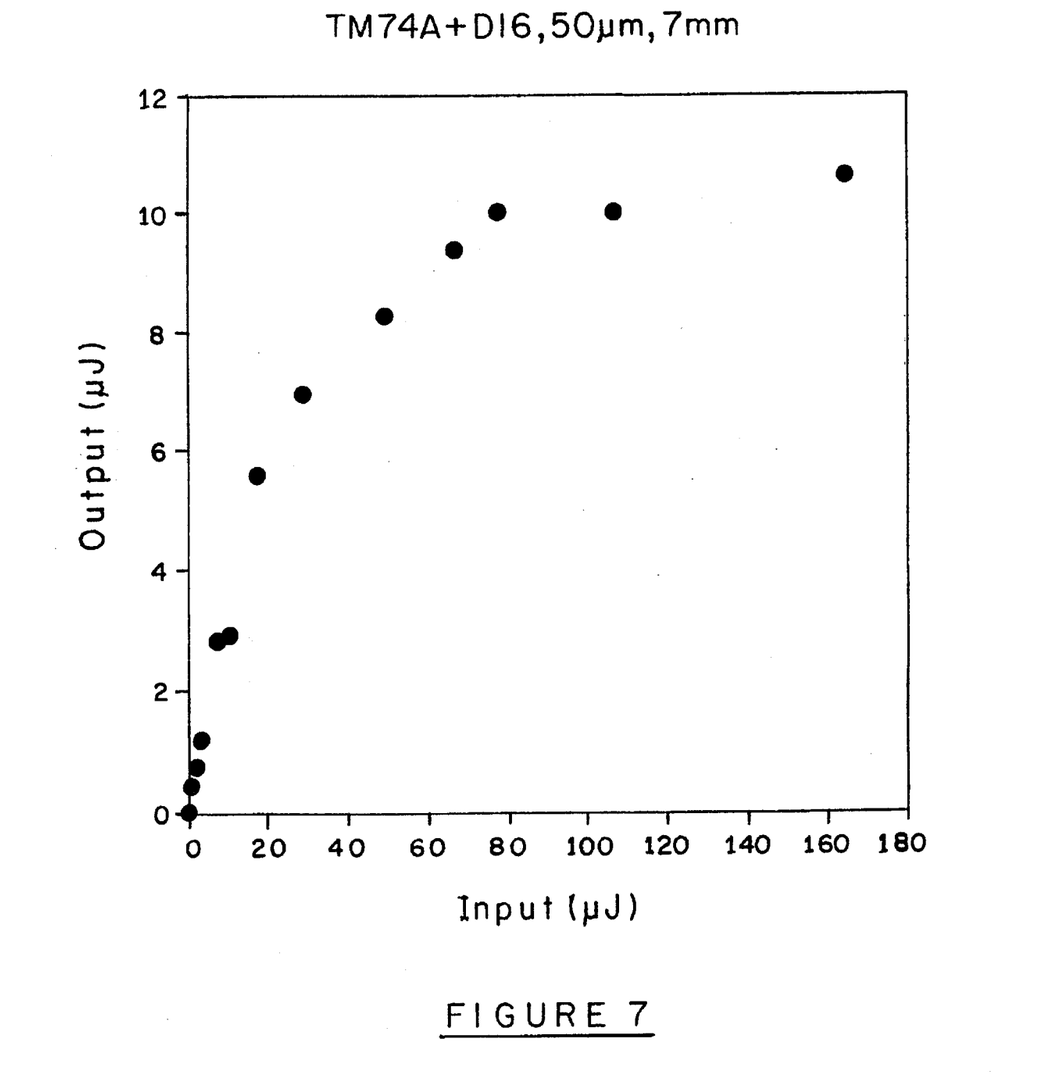
FIG. 7 is a plot of output versus input for a dye-doped liquid crystal fiber wherein the fiber length is 7 millimeters and its core diameter is 50 microns.

FIG. 7 is a plot of output versus input, obtained with a D16 dye-doped ILC fiber (length: 7 mm; core diameter 50 μm). The linear absorption rate of the sample is less than approximately 1 cm$^{-1}$. The low power transmission of the fiber is measured to be about 37% (adjusted for reflection loss at the uncoated input and exit windows). FIG. 7 shows that the transmission begins to deviate from linearity at an input energy of about 20 μJ, i.e., an input fluence value of ~0.8 J/cm$^2$.

To examine how other dopants may improve the nonlinear scattering and defocusing effects responsible for the optical limiting performance of the ILC cored fiber, these experiments were repeated with the same core diameter and length but using Fullerene $C_{60}$ as a dopant (concentration of $C_{60}$ in ILC is ≈0.05% by weight). The linear transmission of the fiber with such $C_{60}$ doped ILC-core fiber is about 65%.

Figure 8:
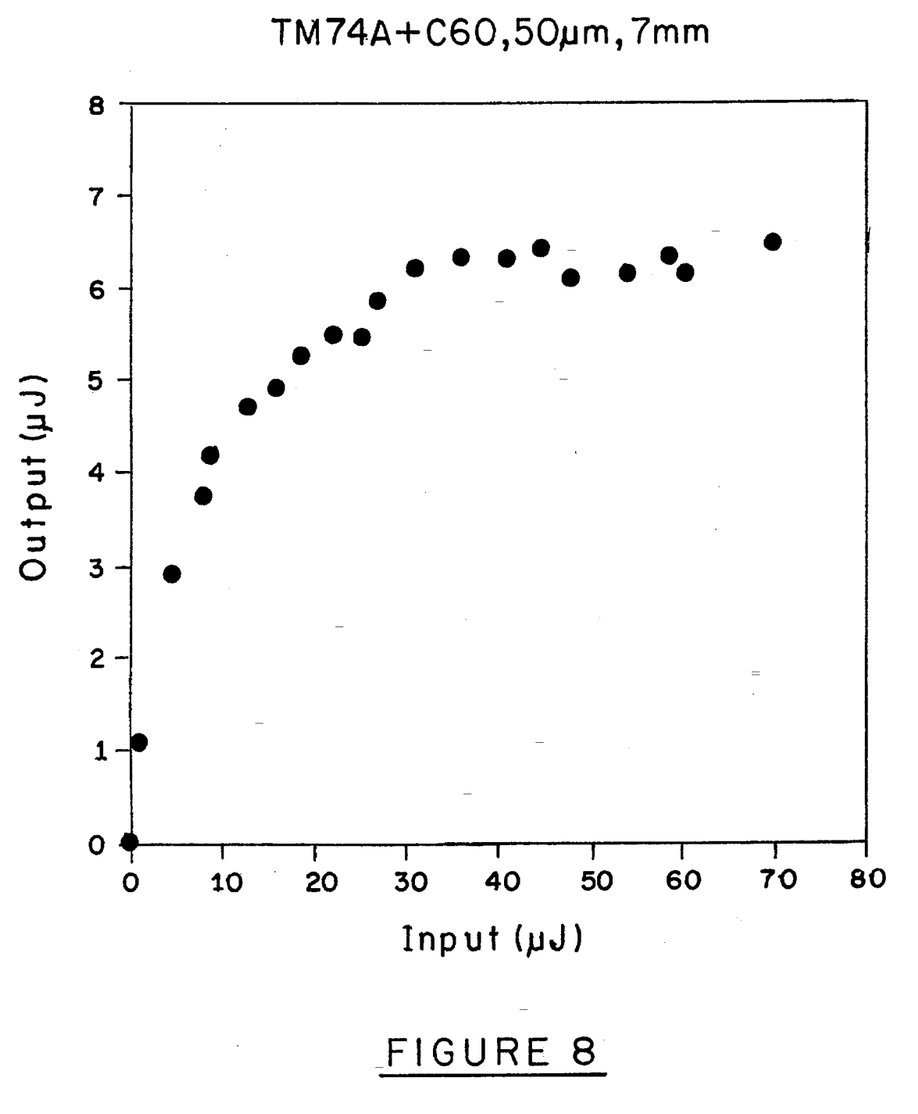
FIG. 8 is a plot of output versus input for a $C_{60}$-doped liquid crystal fiber wherein the fiber length is 7 millimeters and the core diameter is 50 microns.
Figure 9:
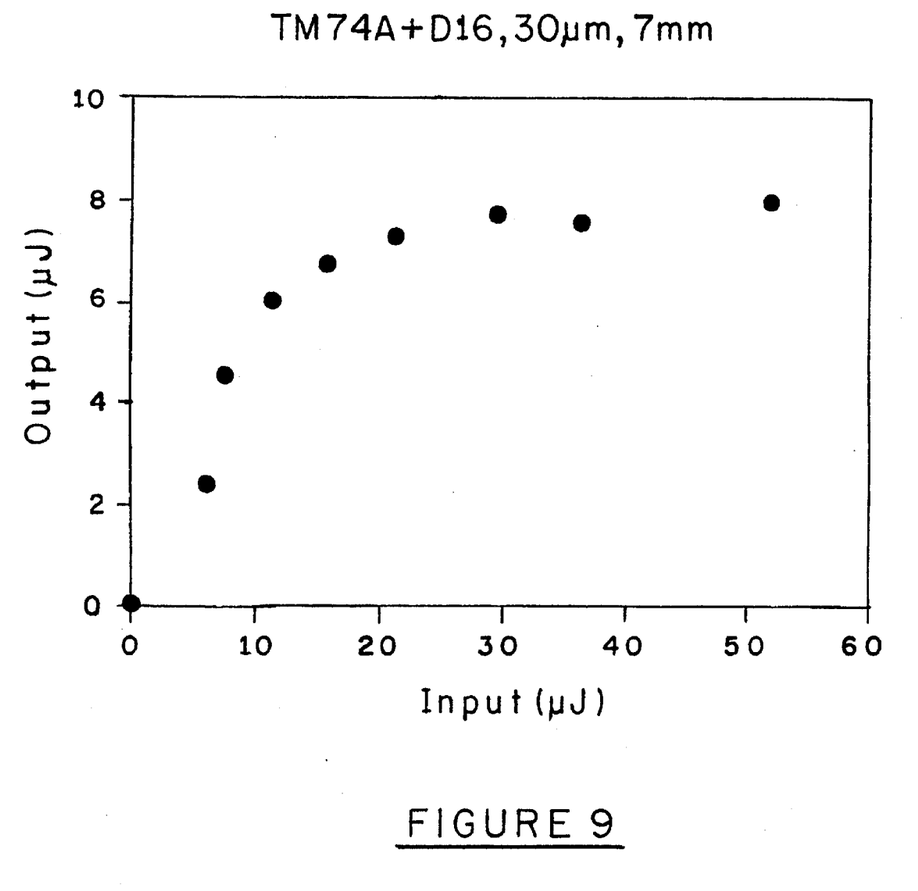
FIG. 9 is a plot of output versus input for a dye-doped liquid crystal fiber wherein the fiber length is 7 millimeters and the core diameter is 30 microns.
Figure 10:
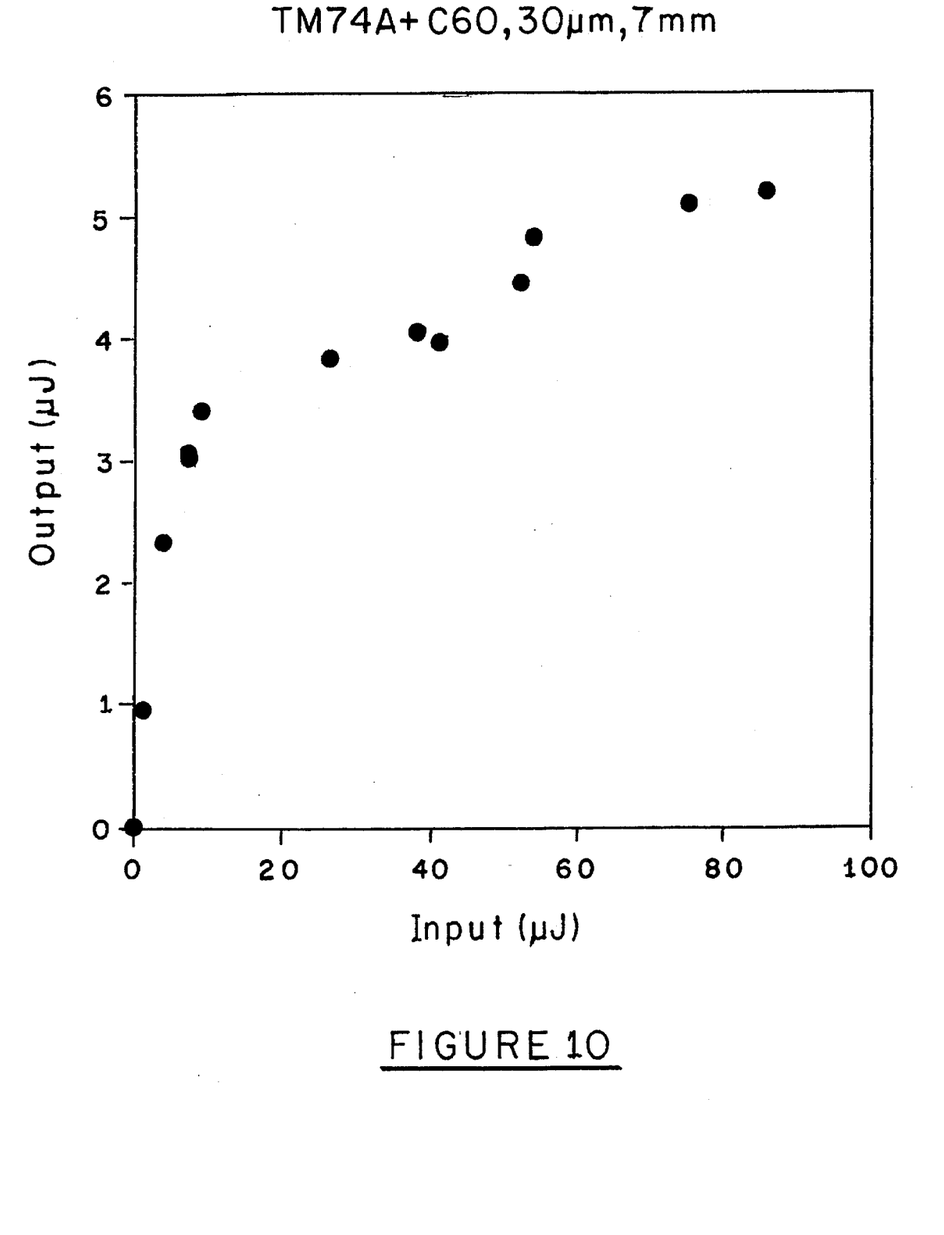
FIG. 10 is a plot of output versus input for a $C_{60}$-doped liquid crystal fiber for a fiber length of 7 millimeters and a core diameter of 30 microns.

FIG. 8 shows that the threshold for deviation from nonlinearity is actually lower in these less absorptive fibers. For the 50 μm core diameter fiber, deviation occurs at a threshold energy of about 8 μJ (fluence≈0.32 J/cm$^2$). This threshold fluence is about 3 times lower than the dye-doped fiber, even through the $C_{60}$-doped fiber is more transmissive. Thus $C_{60}$ appears to be a better dopant. This is further confirmed by limiting studies in fibers of smaller core diameter (30 μm). As shown in FIGS. 9 and 10 for D16 dye-doped and $C_{60}$-doped fibers, the threshold energies (deviation point from linearity) are 11 μm (fluence of 1.1 J/cm$^2$) and 8 μJ (fluence of 0.88 J/cm$^2$), respectively.

By comparative studies of several fibers with D-16 dye dopant versus $C_{60}$, it has been determined that the latter is a better dopant. This is most likely due to the more efficient inter-molecular energy transfer process that, for a given amount of linear and non-linear absorption in $C_{60}$ molecules, creates more thermal/density index changes and nonlinear scattering in the liquid crystalline host, and therefore a lower limiting threshold.

Figure 11:
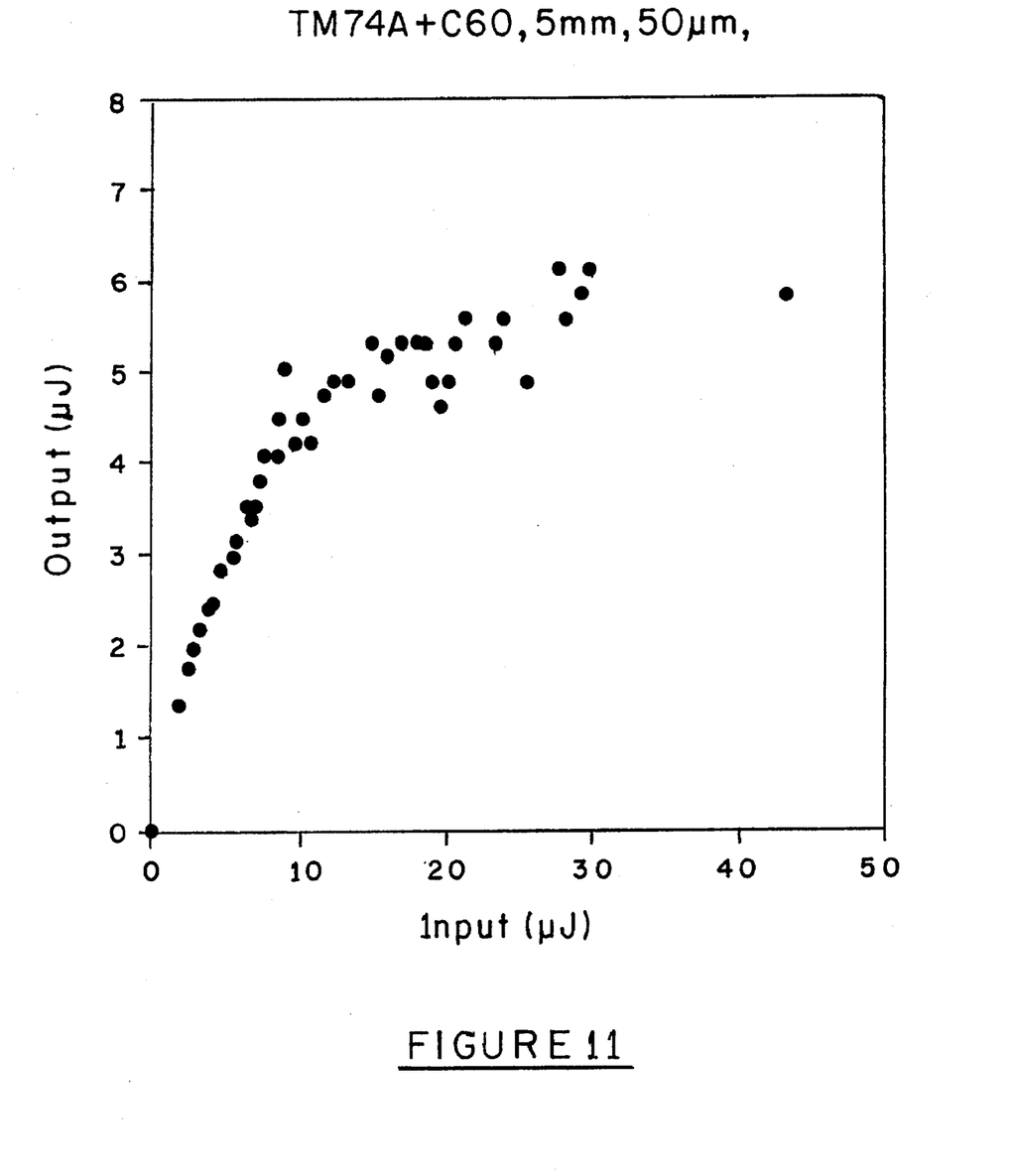
FIG. 11 is a plot of output versus input for a $C_{60}$-doped liquid crystal fiber for a fiber length of 5 millimeters and a core diameter of 50 microns.
Figure 12:
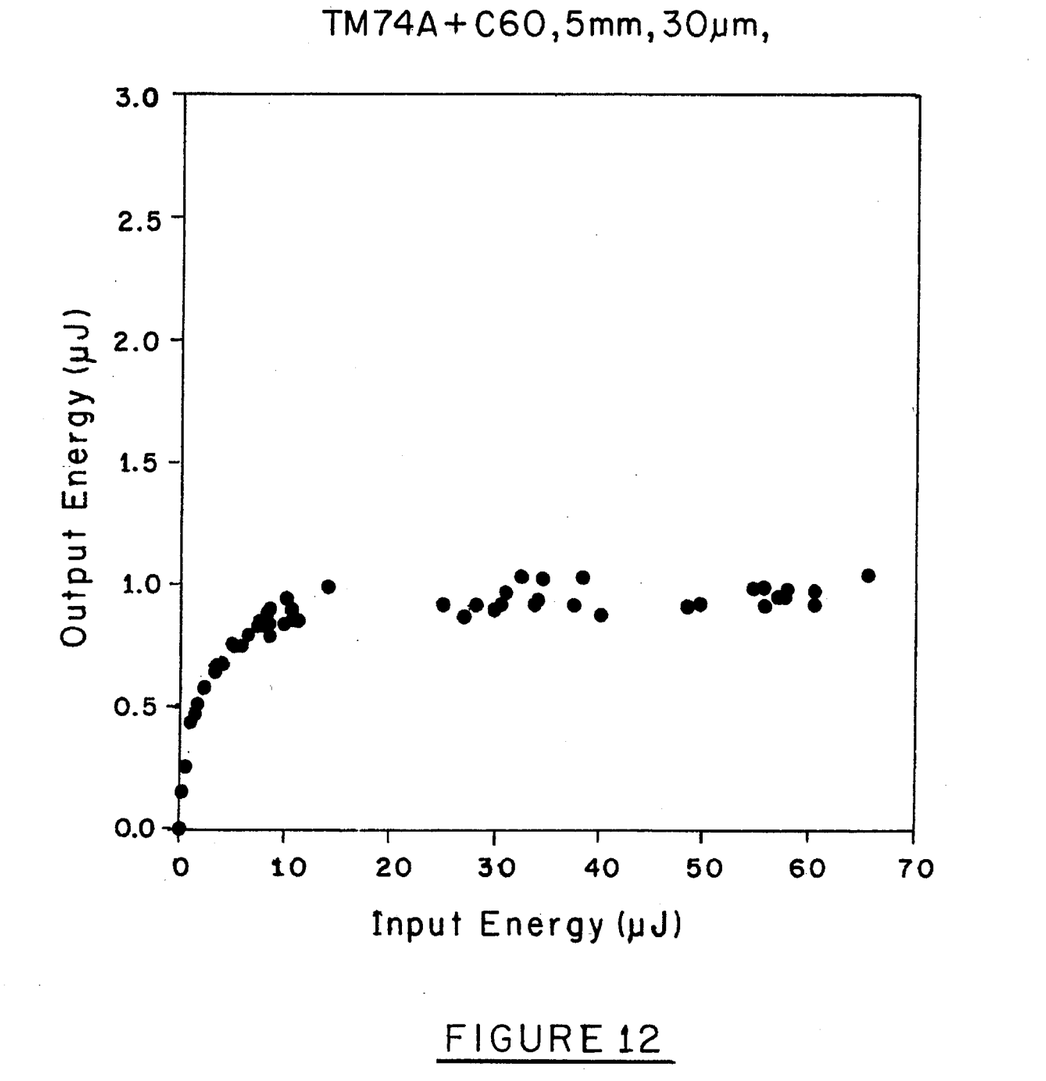
FIG. 12 is a plot of output versus input for a $C_{60}$-doped liquid crystal fiber for a fiber length of 5 millimeters and a core diameter of 30 microns.
Figure 13:
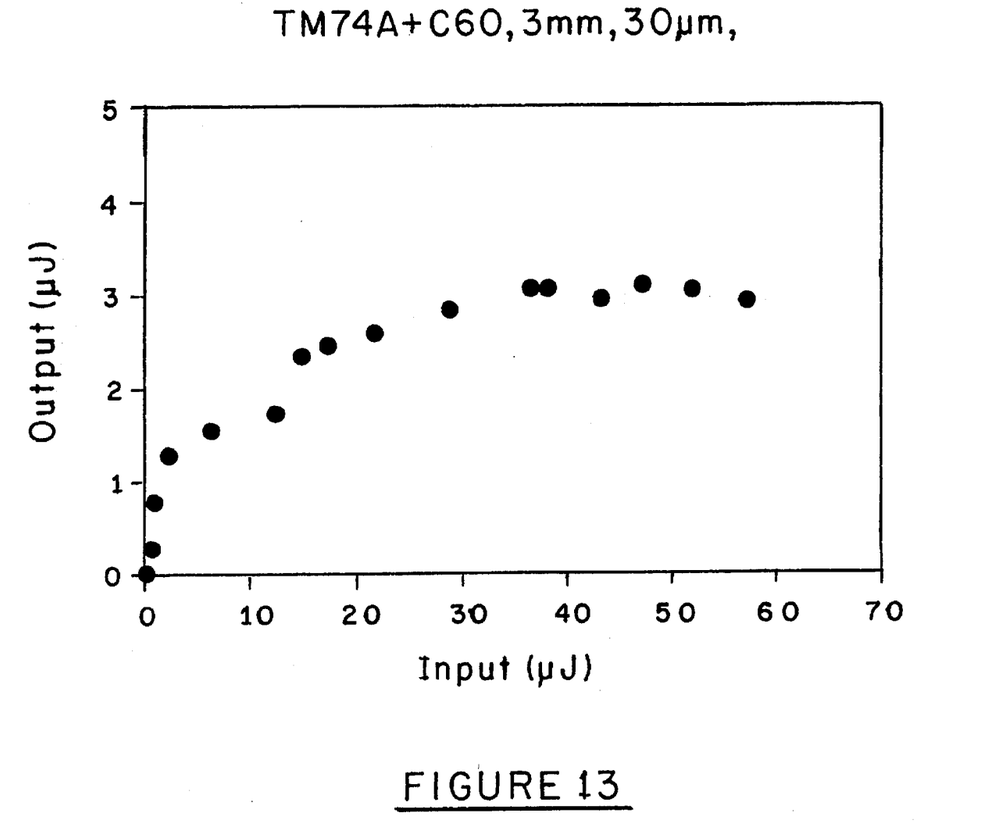
FIG. 13 is a plot of output versus input for a $C_{60}$-doped liquid crystal fiber for a fiber length of 3 millimeters and a core diameter of 30 microns.

To test the thinnest possible liquid crystal fiber array (i.e., shortest fiber) that will still provide limiting action, similar experiments have been carried out in shorter fibers, using $C_{60}$-doped liquid crystal as core material. FIGS. 11 and 12 are for fiber length l=5 mm, and diameter of 50 μm and 30 μm, respectively. They show limiting thresholds (deviation from linear transmission) of 6 μJ (~0.3 J/cm$^2$) and 3 μJ (~0.3 J/cm$^2$), respectively. Similar limiting actions are observed in a fiber as short as 3 mm of core diameter 30 μm. As shown in FIG. 13, the threshold (deviation from linearity) occurs at around 3 μJ (~0.3 J/cm$^2$).

Figure 14:
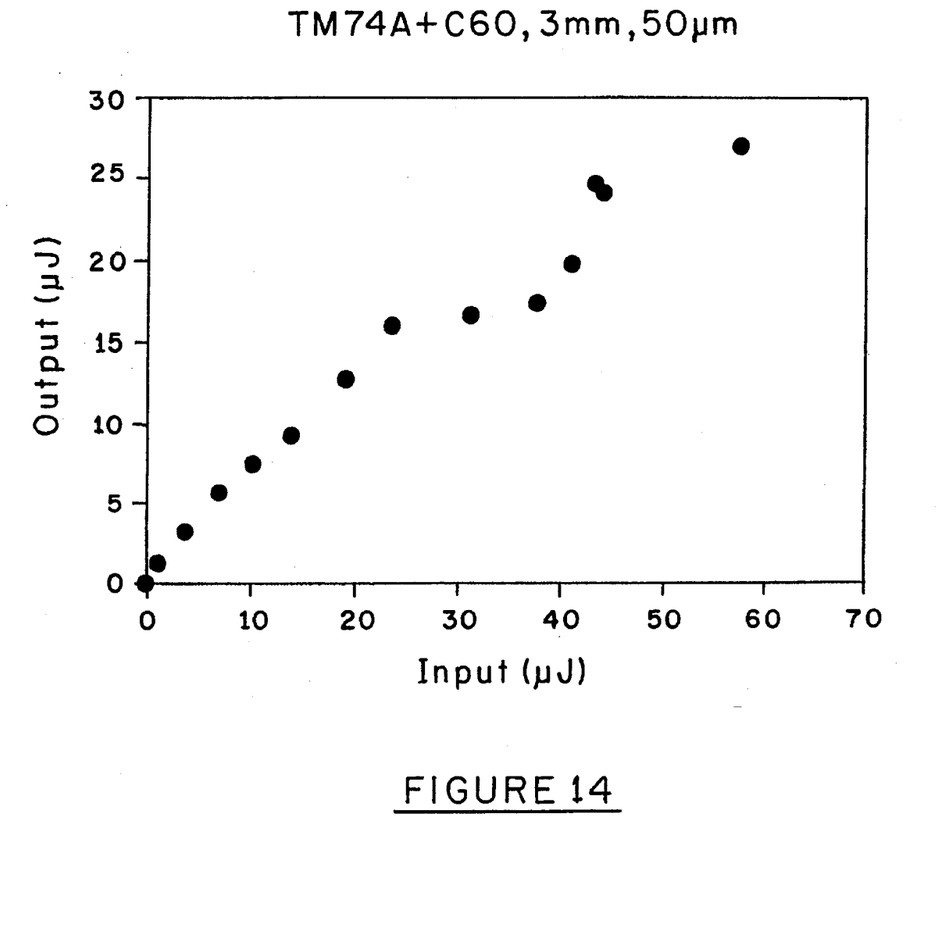
FIG. 14 plot of output versus input for a $C_{60}$-doped liquid crystal fiber for a fiber length of 3 millimeters and a core diameter of 50 microns.
Figure 15:
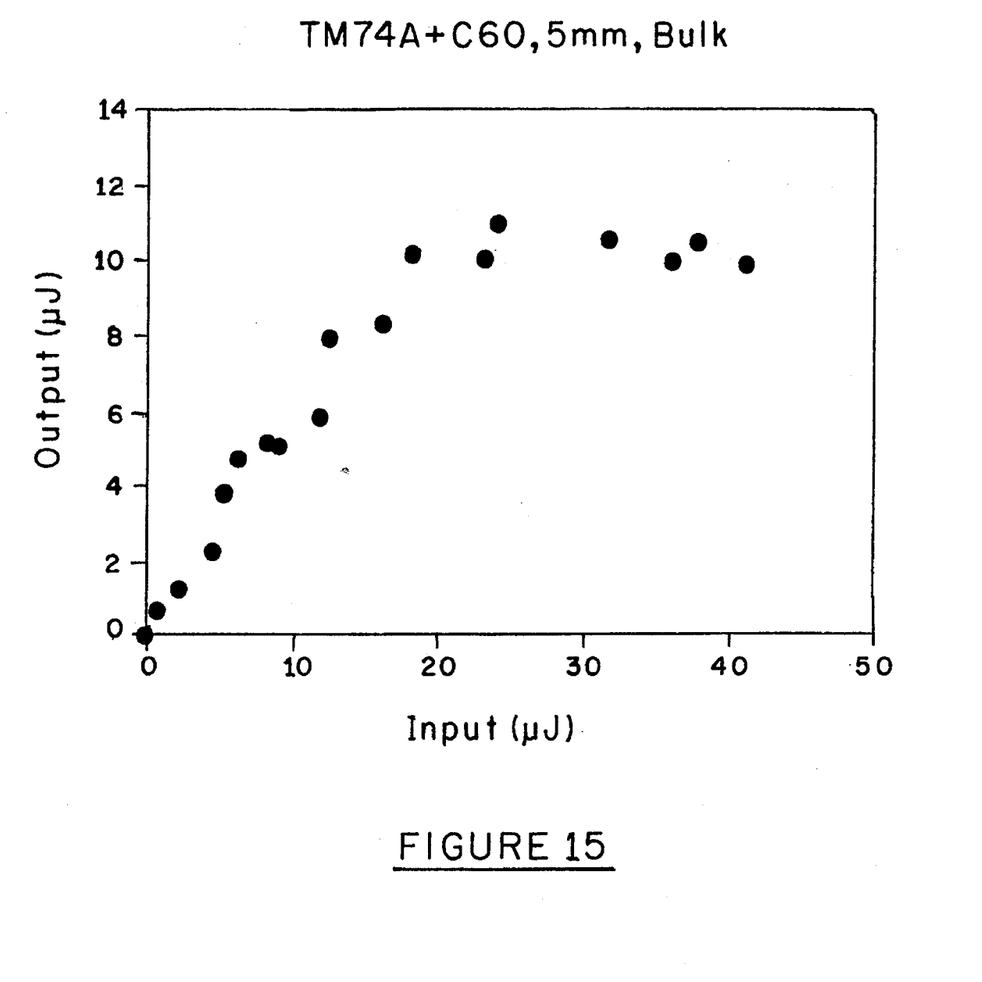
FIG. 15 plot of output versus input for a 5 millimeter thick bulk sample of $C_{60}$-doped liquid crystal showing a higher limiting threshold.

One of the primary reasons for using nonlinear fibers and fiber arrays for optical limiting action is the "extended-interaction length" (EIL) concept. EIL is significant only if the fiber length l is much larger than the Rayleigh range $l_R = n\omega_0^2/\lambda$. The examples given in FIGS. 7–13 fall in this category. On the other hand, for the case $l \bar{\ }l_R$, the performance is expected to be poorer. This is indeed shown in FIGS. 14 and 15, for a ($2\omega_0$=50 μm, l=3 mm) fiber and a bulk film (l=5 mm), respectively. The thresholds (deviation from linearity are approximately greater than 20 μJ (corresponding to threshold fluence approximately greater than 2 J/cm$^2$), i.e., about 4 times larger than those obtainables in fiber geometry fulfilling the EIL condition.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A liquid crystal fiber array comprising:
   a unitary body having incident and transmitting faces and including a plurality of capillary passages extending between said incident and transmitting faces;
   a liquid phase liquid crystal material positioned in each of said capillary passages, said capillary passages having diameters in a range of about 2 microns to 500 microns; and
   optically transparent closures positioned on said incident and transmitting faces for retaining said liquid phase liquid crystal material within said capillary passages, said liquid crystal material exhibiting an optical limiting effect upon incidence of high intensity optical energy.

2. The liquid crystal fiber array as recited in claim 1 wherein said unitary body is transparent and exhibits a refractive index which is less than a refractive index of said liquid phase liquid crystal material, thereby causing an optical beam incident on a capillary to be substantially confined to within said liquid phase liquid crystal which fills said capillary.

3. The liquid crystal fiber array as recited in claim 2 wherein said unitary body material is selected from the class consisting of: glasses and polymers having refractive indices in the range of 1.49–1.54.

4. The liquid crystal fiber array as recited in claim 2 wherein said liquid phase liquid crystal material is isotropic at ambient temperature and exhibits a refractive index of 1.55 or higher.

5. The liquid crystal fiber array as recited in claim 2 wherein said liquid crystal material exhibits the liquid phase at ambient temperature.

6. The liquid crystal fiber array as recited in claim 5 wherein the liquid crystal material is selected from the group consisting of: E-7, 5CB and TM74A, where: E-7 is a mixture of the following compounds:

5CB takes the form and TM74A takes the form of where: (R = $C_6H_{13}$); or (R = $C_3H_7$); or
(R = $C_8H_{17}$); or (R = $C_5H_{11}$);
2M4 = $CH_3CH_2CHCH_2$—.
            |
           $CH_3$ 7. The liquid crystal fiber array as recited in claim 2 wherein said liquid phase liquid crystal material includes a dopant that is absorptive of optical energy within the visible range.

8. The liquid crystal fiber array as recited in claim 7 wherein said dopant is selected from the group consisting of: laser dyes, dichroic dyes, fullerene $C_{60}$, $C_{70}$, and phthalocyanines.

9. The liquid crystal fiber array as recited in claim 7 wherein said dopant is fullerene $C_{60}$.

10. The liquid crystal fiber array as recited in claim 2 wherein said capillary passages exhibit a diameter falling within the range of approximately 10 microns to 30 microns.

11. The liquid crystal fiber array as recited in claim 2, wherein said unitary body manifests a thickness in a range of about 3 mm to 7 mm between said incident and transmitting faces.

* * * * *

UNITED STATES PATENT AND TRADEMARK OFFICE
CERTIFICATE OF CORRECTION

PATENT NO.   : 5,589,101
DATED        : December 31, 1996
INVENTOR(S)  : Iam-Choon Khoo It is certified that error appears in the above-indentified patent and that said Letters Patent is hereby corrected as shown below:

Column 1, between the Title and Field of Invention: insert --This invention was made with governmental support under Contract No. F29601-93-C0027 awarded by the Department of the Air Force. The Government has certain rights in this invention.--

Signed and Sealed this

Twenty-second Day of April, 1997

Attest:

BRUCE LEHMAN

*Commissioner of Patents and Trademarks*

*Attesting Officer*